United States Patent [19]
Berzack

[11] Patent Number: 5,792,407
[45] Date of Patent: Aug. 11, 1998

[54] METHOD FOR ATTACHING FLEXIBLE, LOW DENSITY OR COMPRESSIBLE STRUCTURES TO INJECTION MOLDED POLYMER PARTS

[76] Inventor: Jeffrey A. Berzack, 38111 Lordstown, Sterling Heights, Mich. 48312

[21] Appl. No.: 617,362

[22] Filed: Mar. 18, 1996

[51] Int. Cl.$^6$ .......................... B29C 45/14; B29C 45/16
[52] U.S. Cl. .................. 264/229; 264/263; 264/265; 475/129.1
[58] Field of Search .................. 264/263, 266, 264/229, 265, 321, 135; 425/129.1

[56] References Cited

U.S. PATENT DOCUMENTS

| | | |
|---|---|---|
| 2,666,954 | 1/1954 | Potter ............................ 264/135 |
| 4,409,163 | 10/1983 | Van Manen . |
| 4,652,415 | 3/1987 | Nguyen et al. . |
| 5,091,131 | 2/1992 | Schumacher et al. . |
| 5,122,320 | 6/1992 | Nasui et al. . |
| 5,401,449 | 3/1995 | Hill et al. . |

Primary Examiner—Jan H. Silbaugh
Assistant Examiner—Edmund H. Lee
Attorney, Agent, or Firm—Young & Basile, P.C.

[57] ABSTRACT

A method and means for attaching flexible, low density or compressible structure such as foam to injection molded parts, wherein a mold has a recess shaped for a corresponding flexible, low density or compressible structure. A valve plate made of injected material is placed against the foam structure to compress and protect the foam structure from molten injected material. The valve plate has through apertures for limited access of the injected material to predetermined surface portions of the foam. The molten injected material forms an adhesive between the foam structure and valve plate to adhere the foam structure to the valve plate, and the resultant final component assembly.

9 Claims, 4 Drawing Sheets

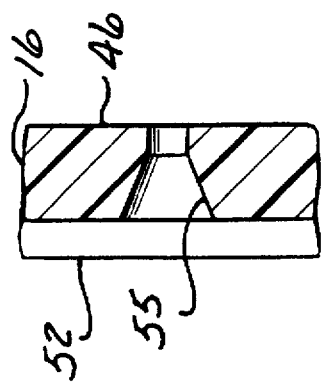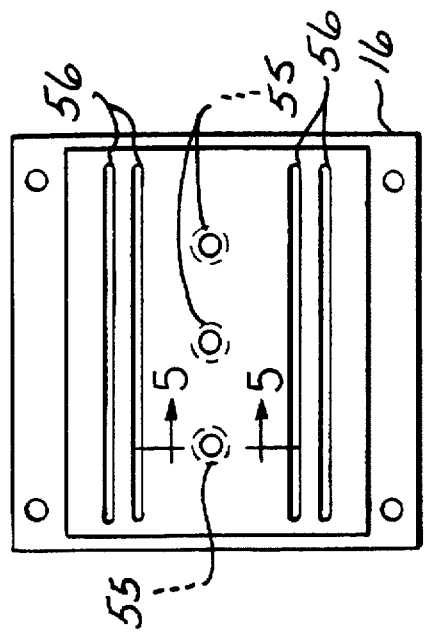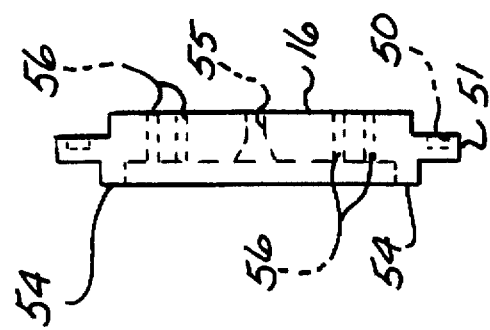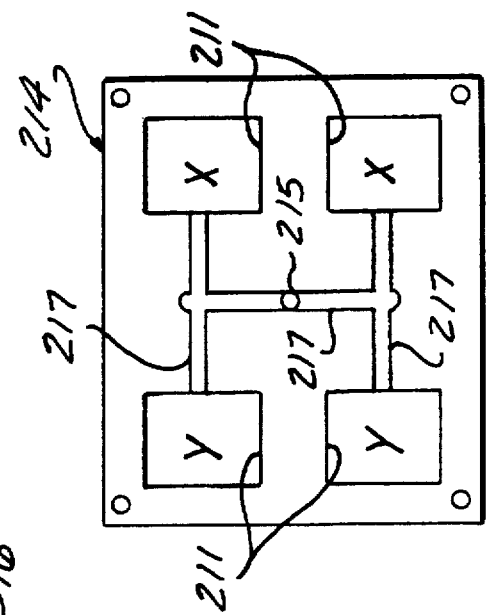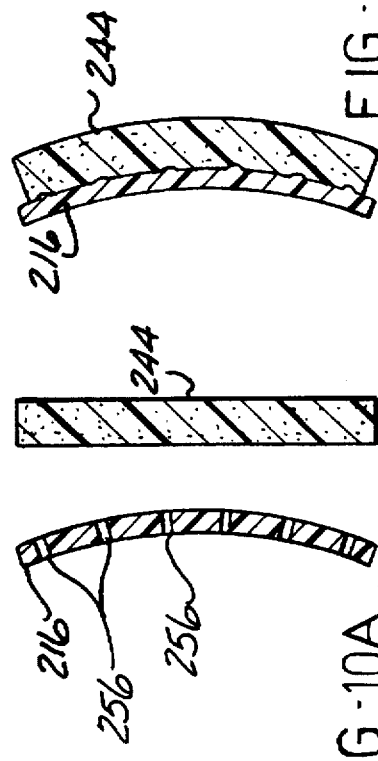

METHOD FOR ATTACHING FLEXIBLE, LOW DENSITY OR COMPRESSIBLE STRUCTURES TO INJECTION MOLDED POLYMER PARTS

FIELD OF THE INVENTION

The present invention relates to a method and apparatus for attaching flexible, low density or compressible structures, such as open cell skeletal foams to injection molded polymer parts.

BACKGROUND OF THE INVENTION

Automotive components, such as trim panels HVAC doors, straps and other utilities such as foam paint pads are made with a facing layer and an open cell flexible foam that are attached to form an integral unit. The open cell flexible foam can provide internal cushioning support for a component, such as in the case of trim panels. The open cell flexible foam may also provide the application device itself, such as in the case of foam paint pads. One method to manufacture such products includes placing a flexible foam portion on a dielectric board, the facing layer is placed over the flexible foam portion and the two materials are secured together with dielectric heating. One disadvantage of this method is that the manufacturing of the component is expensive and involves various portions of the component to be produced in separate operations that are later assembled.

Another method incorporates a heat sensitive adhesive film that is laid on the layer of the open cell flexible foam. The facing layer, flexible foam and adhesive film are laid on a support surface of a mold part. The lower mold part is closed by an upper mold part after the layers are laid on the support surfaces. Once the mold is closed, a urethane precursor mixture is injected into the mold so that it reacts with the flexible foam to form a structurally semi-rigid substrate. The structural urethane foam substrate raises the temperature of the urethane foam to about 400° F. which activates the adhesive film to form bonding of exposed layers. A disadvantage of this procedure is the added requirement of using a film layer having an adhesive barrier film thereon.

Therefore, it is desirable to provide a method and means for attaching skeletal foam structures to injection molded polymer parts without requiring the expensive dialetric heating process. It is further desirable to provide a method that does not require an extra adhesive material to bond the layers. It is also desirable to provide an apparatus that molds the component and attaches the skeletal foam structure in one step.

SUMMARY OF THE INVENTION

The current invention addresses the aforementioned concerns. The invention is a method and apparatus for attaching flexible, low density and compressible structures, such as skeletal foam structures to an injection molded polymer to provide a product such as used in HVAC automotive components, i.e. vent doors and duct work, and used in other components such as sponge paint brushes. The method includes placing a valve plate having the same shape as the foam structure along with the foam into an appropriate mold cavity. The foam is set into a recess or cavity in the mold so that the foam is not exposed to the molten polymer except at predetermined locations. The valve plate has through apertures at the predetermined locations so that the foam will be exposed to molten polymer through the apertures when the molten polymer is injected into the die or mold. The valve plate may further include hook-shaped notches or through apertures located in the upper and lower ends of the valve plate to allow the molten polymer to flow into the notch crevices or through apertures so as to secure the valve plate to the injected polymer upon cooling. Extending lateral legs may extend perpendicularly from the valve plate or from the mold cavity surface for compressing the foam when the mold is closed in order to limit the penetration of molten polymer into the foam.

When the molten polymer is introduced into the mold structure, the molten polymer flows into and through the apertures in the valve plate to contact respective portions of the foam. Thereby, for a thermoplastic or thermoset foam, the molten polymer infiltrates into the open cell matrix of the foam and bonds thereto upon solidification fusing the two structures together. Molten polymer also flows into the hook-shaped notches or apertures at the outer perimeter of the valve plate to secure the molten polymer upon cooling to the valve plate. As the molten polymer cools, the portion of the polymer that contacts the foam adheres to the foam and reacts as an adhesive. As a result, the valve plate becomes integral with the final molded product. The final product includes the foam, valve plate and the solidified polymer.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 4a is a plan view of a valve plate used with the first embodiment of the present invention;

FIG. 4b is a side view of the valve plate in FIG. 4a;

FIG. 5 is a view taken along 5—5 of an orifice in FIG. 4a;

FIG. 9 is a plan view of a mold layout having multiple cavities;

FIG. 10a is a schematic view of a curved valve plate and a foam sheet before attachment thereto; and FIG. 10b is a schematic view of the curved valve plate and foam sheet of FIG. 10a after attachment thereto.

DESCRIPTION OF THE PREFERRED EMBODIMENT

Figure 1:
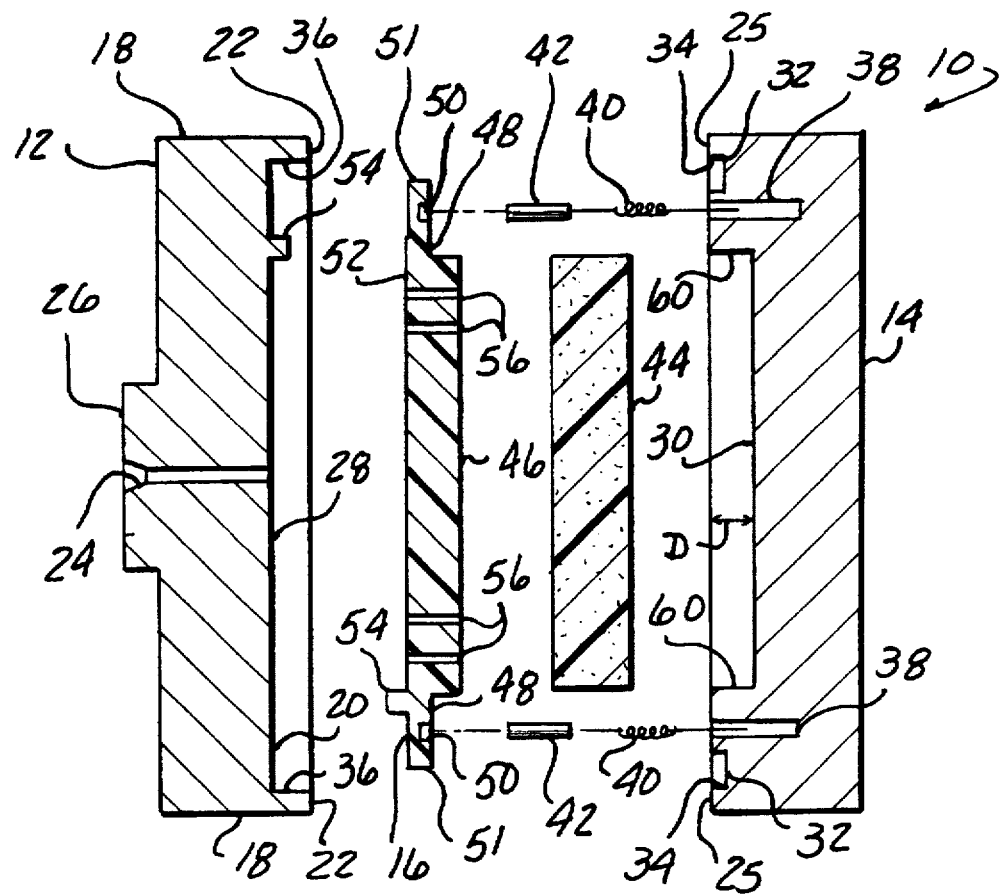
FIG. 1 is an exploded view of the mold apparatus used with the first embodiment of the present invention.
Figure 2:
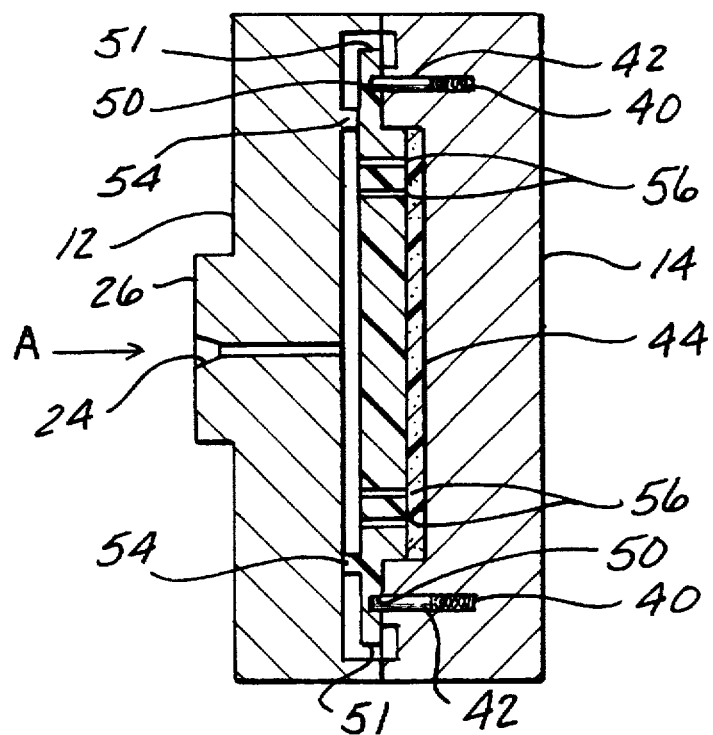
FIG. 2 is a view of the mold apparatus of the first embodiment in a closed position.
Figure 3:
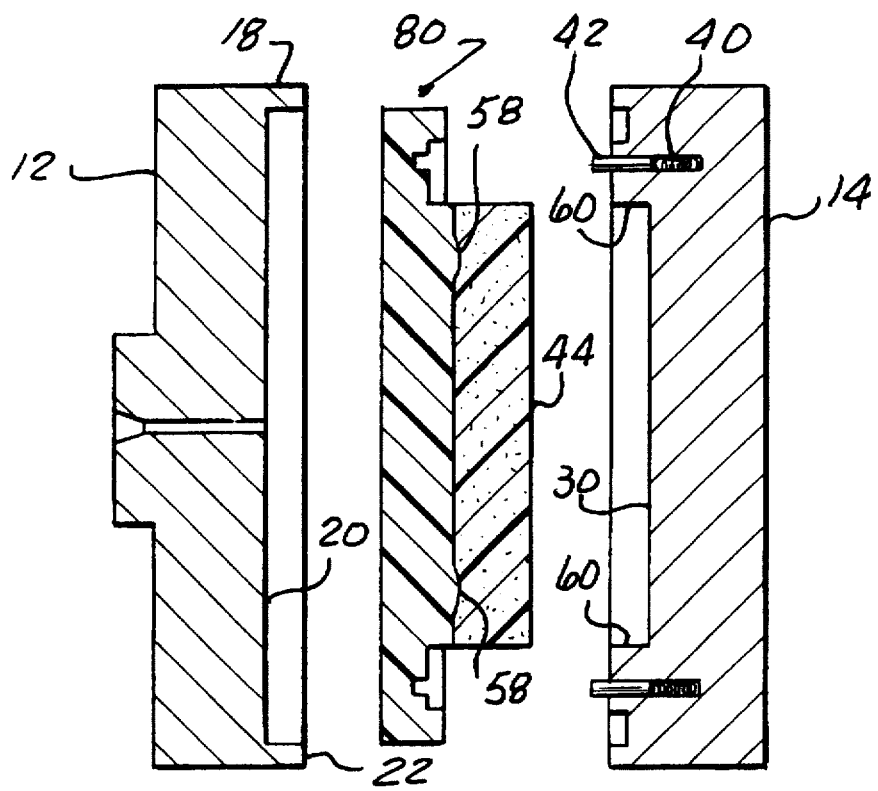
FIG. 3 is a view of the mold apparatus of the first embodiment in the open position and the final molded part.

As seen in FIGS. 1–3, a mold apparatus 10 of the first embodiment comprises a cover mold half 12, an ejector mold half 14 and a valve plate 16. The interior of the cover mold half 12 together with the ejector mold half 14 define the shape of the final injection molded part. The cover mold half 12 has forward extending portions 18 around the perimeter that forms a first cavity 20 therein. The forward extending portion 18 has a front surface 22 for abutment to a corresponding surface 25 on the ejector mold half 14. A through access aperture 24 extends from a back surface wall 26 through to the opposing cavity wall 28 for fluid flow of the molten resin into the mold cavity 20.

The ejector mold half 14 is similar to the cover mold half 12 but in addition, incorporates a few modifications. The ejector mold half 14 includes the extended raised portion 25 around the perimeter that forms a second cavity 30 therein. Furthermore, the ejector mold half 14 may contain the means by which to eject or push the final molded part out of the mold according to typical injection mold standard industry technology. The forward extending raised portion 25 of the ejector mold half 14 has a groove 32 running the perimeter of the ejector mold half 14 in the forward wall surface 25 of the ejector mold half 14. As seen in FIG. 2, an exterior wall 34 of the groove 32 corresponds to the laterally extending inner wall 36 of the first cavity in the cover mold half 12, such that when the cover mold half 12 and ejector mold half 14 are in the closed position, as seen in FIG. 2, the lateral wall 36 and the exterior wall 34 of groove 32 form a continuous surface. This continuous surface defines the outer edge of the final molded part.

Preferably, four recesses 38 are located into the forward extending raised portion 25 of the ejector mold half 14 near each corner. Within each recess 38 is a spring 40 and detent pin 42 combination. The spring 40 is biased to push the pin 42 toward the cover mold half 12. The springs 40 and pins 42 within the recesses 38 of the ejector mold half 14 are situated such that they face the first cavity 20 of the cover mold half 12 when in the closed position. The second cavity 30 in ejector mold half 14 is configured for receiving and retaining a predetermined and corresponding shaped skeletal foam structure 44 therein. Foam 44 can be slightly larger than cavity 30 so as to allow for a compression fit once inserted, thereby retaining foam 44.

A valve plate 16 is then placed over the skeletal foam structure 44. The valve plate is a narrow plate approximately 0.030–0.125 inches thick and made of a resin material. The inner surface 46 of valve plate 16 has recessed planar portions 48 such that they lay against the forward extending raised portion 25 of the ejector mold-half 14. Upon closure of the mold halves, 12 and 14, edge of valve plate 51 will extend midway across groove 32, thereby forming a notch and locking the valve plate into the resultant structure by allowing molten resin to solidify around the edge 51 in a hook configuration. At locations corresponding to the spring loaded detent pins 42 on the ejector mold half 14, the valve plate 16 has recesses 50 for receiving the detent pins 42. The valve plate 16 is smaller in size than the first cavity 20 of the cover mold 12 and is shaped to correspond to the shape of the skeletal foam structure 44. Therefore, when the detent pins 42 are located within the recesses 50 of the valve plate 16, the valve plate 16 is prevented from lateral movement within the mold prior to and when the cover half 12 and ejector mold half 14 are in the closed position.

On the external surface 52 of the valve plate 16, and on cavity surface 28, there are positioned a plurality of integral pins or bosses 54 that space the valve plate 16 away from the inner cavity wall 28 of the cover mold half 12; and at the same time the bosses 54 push the valve plate 16 into the skeletal foam structure 44 in the second cavity 30 of the ejector mold half 14, thereby compressing the foam structure 44. The valve plate 16 further includes apertures and/or slots 56 extending through the width of the valve plate 16 to provide access of the molten polymer to the foam structure 44. The slots 56 and orifices 55 range in size of 0.005–0.100 inches wide or in diameter, respectively. The slot 56 and orifice 55 combination patterns, as shown in FIGS. 4a and 4b, can be employed to regulate the flow and penetration of the molten resin to the foam structure 44. The flow of the molten resin through the foam structure 44 may be further regulated by profiling the orifices 55, as shown in FIG. 5 which concentrates the molten resin to a small area of the foam structure 44. In addition to the slots and orifices to direct and control molten resin to foam structure 44, the integral pins and bosses 54 on valve plate 16 and on cavity surface 28, compress the foam structure 44 within second cavity 30 to a predetermined thickness and density corresponding to the depth D of second cavity 30. Compressing the foam structure 44 controls the penetration of the molten resin in proportion to the degree of compression, and thereby may confine the molten resin to the upper surface portion of foam structure 44 as signified by the protuberances 58 shown in FIG. 3.

During the injection process of the multi-layer article, a precut skeletal foam structure 44 is placed within the second cavity 30 of the ejector mold half 14 such that the foam structure 44 does not extend beyond the cavity walls 60. The valve plate 16 has essentially the same surface area as the foam structure 44 to protect the foam structure 44 from the hot injected resin. The valve plate may be slightly smaller than the foam structure 44 if it is desirable to bond the outer periphery of the foam structure 44 to the injected material. The valve plate 16 is then placed over the skeletal foam structure 44 and aligned such that the spring loaded pins 42 are received within the recess 50 of the valve plate 16. As a result, the inner surface 46 of the valve plate 16 will be placed against the skeletal foam structure 44 within the second cavity 30 of the ejector mold half 14. The cover mold half 12 will then be placed over the ejector mold half 14. The surface 28 of the first cavity 20 of the cover mold half 12 will place pressure against the pins or bosses 54 of the valve plate 16 and thereby compress the valve plate 16 into the skeletal foam structure 44. As a result, the valve plate 16 will compress the foam 44 and position it so that the flow of molten resin is regulated and positioned to the compressed foam. By compressing the foam 44, the density of the foam 44 is adjusted which controls the degree of penetration or depth of the molten resin into the foam 44. Once the cover mold half and ejector mold half are locked together molten resin (designated by arrow A) may be introduced into the mold apparatus 10. The molten resin will fill vacant areas around valve plate edge 51 to lock and secure the valve plate 16 to the injected material once the injected material has solidified. The molten resin flowing through slots 56 and orifices 55 will bond the foam structure 44 to the injected material and valve plate 16. After the injected resin has cooled, the cover mold half 12 and ejector mold half 14 can be separated producing the final injection molded article. The foam structure 44 will essentially regain its uncompressed dimensions again. The final injection molded part is signified by 80 and integrally includes valve plate 16, foam structure 44 and the injected material.

Figure 8:
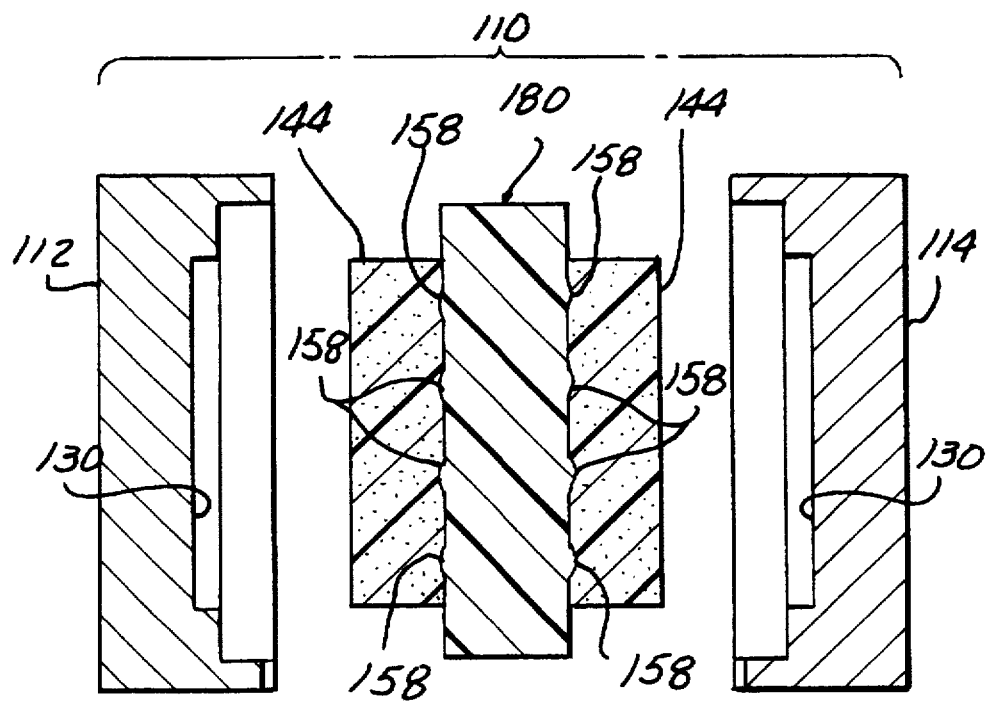
FIG. 8 is a view of the mold apparatus of the second embodiment in the open position and the final molded part.
Figure 6:
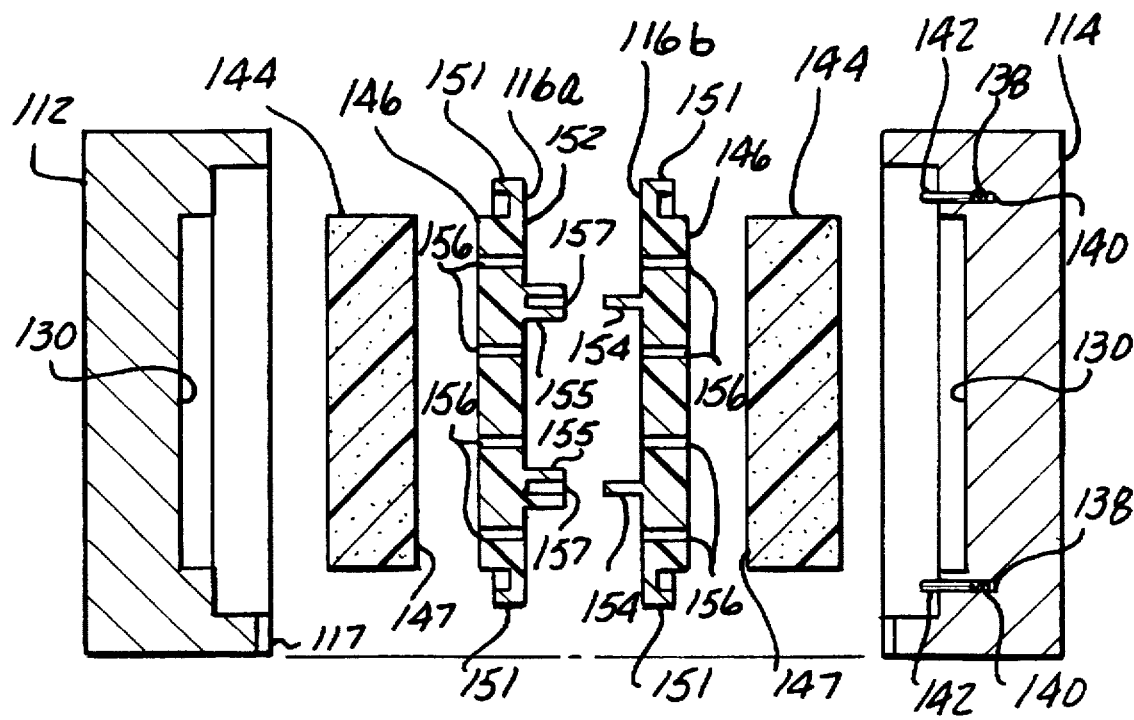
FIG. 6 is a side view of the mold apparatus incorporating the second embodiment of the present invention.
Figure 7:
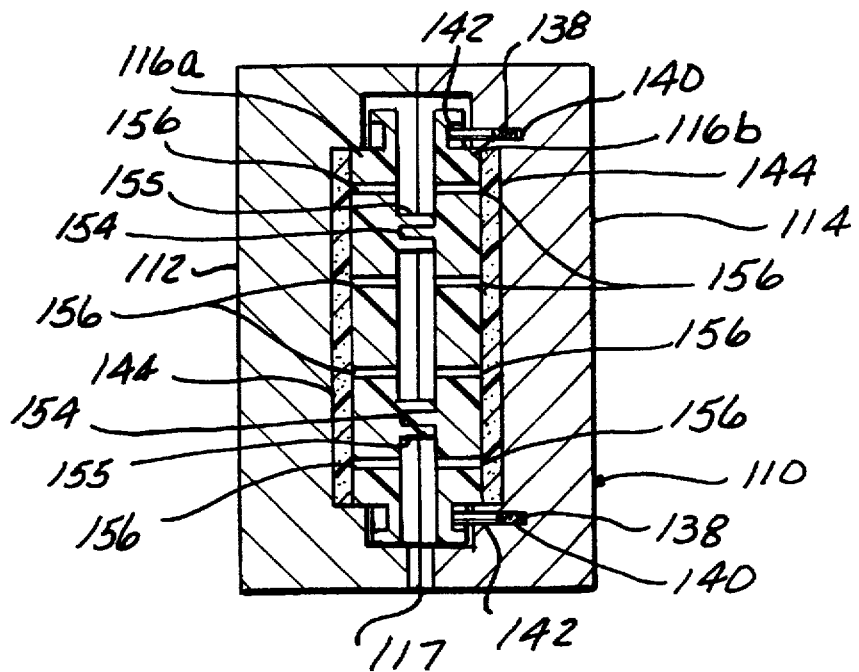
FIG. 7 is a view of the mold apparatus of the second embodiment in a closed position.

The second embodiment provides a mold apparatus 110 and method for constructing an injection molded polymer part having attached skeletal foam structures 144 on opposing sides of the polymer part. As seen in FIGS. 6–8, a mold having a cover mold half 112 and an ejector mold half 114 is provided with recesses 130 shaped to correspond to the shape of a skeletal foam structure 144 to be placed in each recess 130. One, or both the cover mold half 112 or ejector mold half 114 is provided with a side gate 117 for entry of the injected material into the mold as will be discussed further. The depth of the recesses 130 is less than the thickness of the foam structure 144 in order to allow for the compression of the foam 144. Similar to the first embodiment, four recesses 138 are located in the ejector mold half 114 for housing a spring 140 and detent pin 142 combination therein.

The foam structures 144 are first placed into the respective recesses 130. A valve plate 116 is placed against the foam structures 144 and depresses the foam structures 144 within the area of the recess 130 such that a planar surface 146 of each valve plate 116 is configured to correspond and cover an inner surface 147 of each foam structure. The planar surface 146 is placed against the foam structure 144 and retracts it within the boundaries of the recess 130. A forward surface 152 of the first valve plate 116a contains at least two extending tube portions 155 having an inner cavity surface 157 that extends essentially to the forward surface 152 of said first valve plate 116a. The second valve plate 116b has an extending pin 154 corresponding to each tube portion 155 of the first valve plate. The extending pins 154 are sized and proportioned to be received within the inner cavity 157 of tube portions 155 in the first valve plate. When the pins 154 of the second valve plate 116b are inserted into the tubes 155 of the first valve plate 116a, the forward surface of each respective valve plate 116a, 116b is spaced from the opposing valve plate by the length of the tube portion 155.

Each valve plate 116a, 116b has a plurality of apertures 156 extending from the forward surface 152 through to the planar surface 146. The apertures 156 provide access of the molten resin to exposed portions of the foam structures 144. The apertures may be slots and/or orifices having sizes and profiles similar to those shown in FIG. 4a of the first embodiment. Each valve plate 116a, 116b may also include locking means 151 preferably located along the perimeter of the valve plate. The locking means 151 preferably have a hook configuration that allows the molten resin to flow around the hook portions 151 of the valve plates 116a, 116b and solidify in that position so that the now solidified injected material encompasses the valve plate assembly and becomes integral with the valve plate.

An alternate method to bond the valve plate to the resultant structures is to configure the perimeter of the valve plates as a thin sectional wall, preferably 0.010–0.020 inches thick. Upon contact with the molten polymer the thin section of the valve plate will liquify and fuse with the structure upon cooling.

At least one of the molds halves 112 and 114 includes an access means, such as a side gate 117, through which the injected material can be administered into the mold. The access means 117 in the preferred embodiment is preferably centrally located in the two half molds so that when the two half molds are joined, the access means 117 is formed as seen in FIGS. 6 and 7.

For the assembly, a foam structure 144 is placed within the recess 130 of each half mold 112, 114. The valve plates 116a, 116b may then be placed within the respective molds. Because the valve plates 116a, 116b of the second embodiment include a means for connecting the two valve plates together, i.e. the tubes 155 and pins 154, the valve plates may be connected together before being placed within one of the molds halves. As an alternative, each valve plate 116a, 116b may be placed against the respective foam structures 144 just prior to closing the mold unit so that the pins 154 align with tubes 155. Once the mold is closed, the valve plates 116a, 116b essentially cover the foam structures 144 and protect the foam structures 144 from the molten resin. By compressing the foam 144, the density of the foam is adjusted to control the degree of penetration of the injected material into foam 144. As a result, the molten resin is confined to the upper surface portions of the foam structure as signified by the protuberances 158 shown in FIG. 8. The final injection molded part is signified by 180 and integrally includes the valve plates 116a, 116b, foam structures 144 and solidified molten resin.

The valve plate should preferably be a molded piece made of the same material or resin used for the final shot (the injected material) that forms the final component by fusing together the valve plate and foam. Using the same materials will allow for thin sections of the valve plate to melt and fuse when molded. This allows for greater flexibility in design of the components. Another advantage provides an assembly method having greater efficiency and cost savings.

To provide further efficiency of the assembly process, a valve plate 216 can be molded simultaneously in the same mold as the resultant final component when the same material or resin is used. Looking at FIG. 9, a mold layout 214 that has multiple cavities 211 so that preferably half of the cavities (X) can mold valve plates simultaneously while the other half of the cavities (Y) are molding final components in the application whereby one valve plate is used in each final assembly. As for the application whereby more than one valve plate is required per final component, the number of cavities producing valve plates and final components would be appropriately proportional. FIG. 9 shows a mold layout 214 having four cavities 211, but any number of cavities in the mold can be used as is typical and well known by those familiar with injection molding technology. Sprue 215 allows access of the injected molten resin to cavities 211, with proportional distribution through runners 217.

As can be seen in FIGS. 10a and 10b, the valve plate 216 having apertures 256 may be configured in any shape so that upon bonding via the injected molten resin, the foam 244 assumes the shape of the valve plate 216. FIG. 10a indicates a schematic view of a curved valve plate 216 and a straight sheet of foam structure 244. FIG. 10b shows the final component where the foam structure 244 assumed the shape of the valve plate 216. Any shape or combination of shapes of a valve plate 216 can be used to alter the resultant shape of the foam insert 244. Applications are prevalent for foam seals that are required to fit and seal or provide cushion between surfaces that are shapes other than flat. By coordinating the shape of the valve plate 216 and the location of the orifices 256, a limitless variety of resulting foam configurations can be obtained from a flat, sheet foam insert 244.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of attaching a compressible structure onto an injected molded part comprising the steps of:

holding the compressible structure in a mold cavity;

protecting at least a portion of the compressible structure from injected material with protection means for protecting at least a portion of the compressible structure;

compressing the compressible structure to a predetermined density with the protection means prior to injecting material to mold the part;

injecting material into the mold cavity to form the part; and providing access to predetermined surface portions of the compressible structure by the injected material with access means for attaching the compressible structure to the part during the injecting step to form a unitary injection molded part including the injected material, protection means and compressible structure.

2. The method of claim 1 further comprising the step of:

locking the injected material to the protection means of the compressible structure as the injected material solidifies.

3. The method of claim 1 further comprising the step of:

partially melting the predetermined surface portions of the compressible structure by the injected material.

4. A method of attaching a flexible structure onto an injected molded part comprising the steps of:

holding the flexible structure in a mold cavity;

protecting the flexible structure from injected material with protection means:

compressing the flexible structure to a predetermined density Prior to injecting material to mold the part;

providing access to predetermined surface portions of the flexible structure by the injected material with access means during injection of material to mold the part, wherein the flexible structure is protected from the injected material by means of a valve plate and the flexible structure is aligned against the valve plate within a recess of the mold cavity; and locking the infected material to the protection means of the flexible structure as the injected material solidifies.

5. The method of claim 4 wherein the valve plate has notches along a periphery for allowing the injected material to flow around said notches to lock the injected material to the valve plate as the injected material solidifies.

6. The method of claim 5 further comprising the step of:

removing the part from the mold cavity, wherein the part includes the injected material, the valve plate and the flexible structure.

7. The method of claim 4 wherein said flexible structure is a skeletal foam having an open cell matrix and further comprising the step of infiltrating the foam with the injected material to bond the foam to the valve plate.

8. The method of claim 4 wherein the valve plate has thin portions along a periphery and further comprising the step of fusing the flexible structure with the injected material to the valve plate and the part at the thin portions.

9. The method of claim 4 further comprising the step of profiling the valve plate to at least one of a predetermined size, shape and location of the access means.

* * * * *